United States Patent
Penneau et al.

(10) Patent No.: US 6,671,166 B1
(45) Date of Patent: Dec. 30, 2003

(54) DOUBLE LAYER HIGH POWER CAPACITOR COMPRISING A LIQUID ORGANIC ELECTROLYTE

(75) Inventors: Jean-François Penneau, Avon (FR); François Capitaine, Pleuven (FR); Guillaume Herlem, Versailles (FR)

(73) Assignee: Bollore, Quimper (FR)

( * ) Notice: Subject to any disclaimer, the term of this patent is extended or adjusted under 35 U.S.C. 154(b) by 0 days.

(21) Appl. No.: 09/367,197

(22) PCT Filed: Feb. 5, 1998

(86) PCT No.: PCT/FR98/00211

§ 371 (c)(1),
(2), (4) Date: Jan. 18, 2000

(87) PCT Pub. No.: WO98/35369

PCT Pub. Date: Aug. 13, 1998

(30) Foreign Application Priority Data

Feb. 6, 1997 (FR) .......................................... 97 01351

(51) Int. Cl.[7] .................................................. H01G 9/00
(52) U.S. Cl. ........................ 361/504; 361/502; 361/503; 361/508; 361/516; 29/25.03
(58) Field of Search ................................. 361/502, 504, 361/433, 301, 303, 292, 508, 503, 516, 523, 528; 29/25.03

(56) References Cited

U.S. PATENT DOCUMENTS

| | | | | |
|---|---|---|---|---|
| 3,648,126 A | * | 3/1972 | Boos et al. ................. | 317/230 |
| 3,931,552 A | | 1/1976 | Anderson et al. | |
| 4,363,079 A | * | 12/1982 | Sekido et al. ............... | 361/433 |
| 4,626,964 A | * | 12/1986 | Azuma et al. ............... | 361/433 |
| 4,713,731 A | * | 12/1987 | Boos et al. ................. | 361/433 |
| 5,160,653 A | * | 11/1992 | Clouse et al. ............... | 252/62.2 |
| 5,279,910 A | * | 1/1994 | Sasaki et al. ............... | 429/213 |
| 5,303,118 A | * | 4/1994 | Saito et al. ................. | 361/502 |
| 5,658,687 A | * | 8/1997 | Takeda et al. .............. | 429/192 |
| 5,659,457 A | * | 8/1997 | Lian et al. .................. | 361/502 |
| 5,682,288 A | * | 10/1997 | Wani .......................... | 361/502 |
| 5,706,165 A | * | 1/1998 | Saito et al. ................. | 361/502 |
| 5,754,393 A | * | 5/1998 | Hiratsuka et al. .......... | 361/505 |
| 5,953,204 A | * | 9/1999 | Suhara et al. .............. | 361/502 |
| 5,969,936 A | * | 10/1999 | Kawasato et al. .......... | 361/502 |
| 6,094,338 A | * | 7/2000 | Hirahara et al. ............ | 361/502 |
| 6,205,016 B1 | * | 3/2001 | Niu ............................. | 361/503 |

FOREIGN PATENT DOCUMENTS

EP    694935 A1    1/1996

OTHER PUBLICATIONS

Chemical Abstracts, vol. 106, No. 10, Mar. 9, 1987; Abstract No. 77259, Okamoto, Masashi et al.; "Electric double-layer capacitors" XP002043039.
Patent Abstracts of Japan, vol. 17, No. 249 May 18, 1993.
Patent Abstracts of Japan, vol. 14, No. 573 Dec. 19, 1990.

* cited by examiner

Primary Examiner—Dean A. Reichard
Assistant Examiner—Nguyen T. Ha
(74) Attorney, Agent, or Firm—Blakely, Sokoloff, Taylor & Zafman

(57) ABSTRACT

The invention concerns a high power capacitor ideally polarizable consisting of a positive electrode (2) and its current collector (4), a negative electrode (3) and its current collector (5), said electrodes comprising a carbon containing material with high specific surface area, a separator (6) and a non-aqueous liquid electrolyte impregnating said separator and said electrodes. The invention is characterised in that the non-aqueous liquid electrolyte is an organic solution of a sodium or potassium or alkalin-earth metal salt, on their own or mixed in a solvent containing an acid.

16 Claims, 1 Drawing Sheet

DOUBLE LAYER HIGH POWER CAPACITOR COMPRISING A LIQUID ORGANIC ELECTROLYTE

Figure 1:
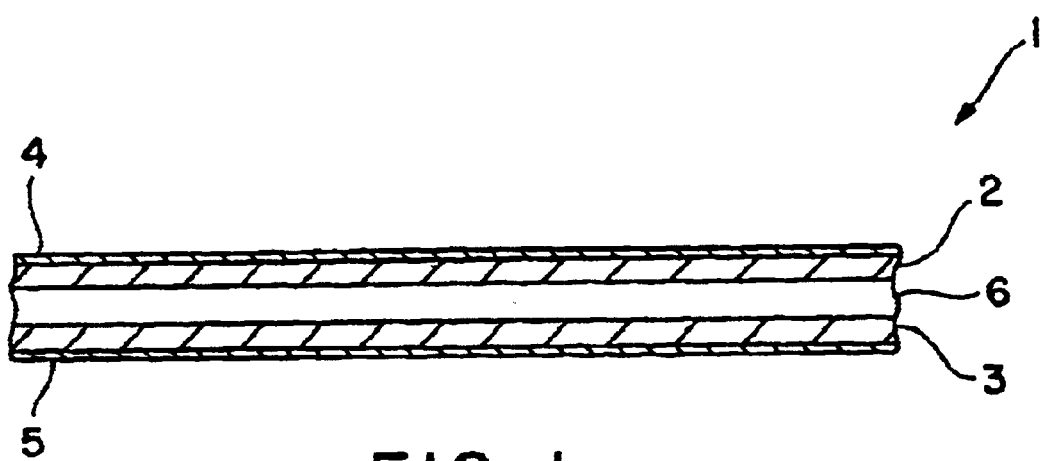

The invention relates to supercapacitors, or high-capacitance capacitors, comprising an electrolyte consisting of an organic solution of a salt.

A supercapacitor is a component intermediate between a capacitor and a battery in terms of energy and power. A battery delivers a great deal of energy (40 to 150 Wh/kg) but this component is limited in terms of power ($<5 \times 10^2$ W/kg). A capacitor delivers a high pulse power ($10^4$ to $10^6$ W/kg) but its associated energy per unit mass is low (<0.1 Wh/kg). The term "supercapacitor" should be understood to mean any electrochemical system using at least the surface properties of an ideally polarizable material of high specific surface area. In other words, the super-capacitor is an electrochemical capacitor of high capacitance.

The origin of the operation of a supercapacitor is based on the principle of the double layer. During charging of the supercapacitor, there is a build-up of ionic species on either side of the two electrodes, at the ideally polarizable material/electrolyte interface. There may also be oxidation-reduction reactions in the presence of redox sites, resulting in a pseudocapacitive system.

Supercapacitors based on the principle of the double layer have been manufactured from a variety of materials. These supercapacitors are assembled from two carbon electrodes having a high specific surface area.

In general, the capacitors furthermore include current leads, a separator lying between the electrodes, an electrolyte and a package sealed with respect to the environment.

One of the key components of a supercapacitor consists of the electrolyte which, typically, comprises a solution of a salt, that is to say a combination of a salt and a solvent.

In general, the electrolytes are low-viscosity liquids and have a high conductivity over a wide temperature range. They must also be of low cost, chemically and electrochemically stable and compatible with carbon or the other materials of which the electrodes are composed.

Many liquid electrolytes intended to meet these requirements have already been proposed.

Patent Application EP-A-704,871 describes an electrolyte consisting of an organic solution of a quaternary ammonium salt. Examples 1 and 2 mention particularly a γ-butyrolactone solution containing 20% monotetramethylammonium phthalate or a γ-butyrolactone solution containing 20% triethylmethylammonium maleic acid.

Patent Application EP-A-694,935 describes a solution in a nitrile solvent of a salt consisting of an ammonium cation and of anions chosen especially from trifluoromethyl sulfonate, bistrifluoromethyl sulfonyl imide, trifluoromethylsulfonyl carbanion, tetrafluoroborate, hexafluorophosphate, hexafluoroarsenate, perchlorate. This document mentions in particular tetraalkylammonium tetrafluoroborate.

U.S. Pat. No. 5,450,279 describes a solution of tetraethylammonium tetrafluoroborate or tetraethylammonium perchlorate in an organic solvent such as propylene carbonate or γ-butyrolactone.

U.S. Pat. No. 4,562,511 describes a double-layer supercapacitor formed from two electrodes separated by a separator impregnated with an electrolyte. Each electrode consists of a polarizable carbon layer and of a conductive layer. The electrolyte is a solution of γ-butyrolactone or propylene carbonate and tetraethylammonium perchlorate.

Patent Application EP-A-660,346 describes a double-layer supercapacitor in which the electrolyte is an organic solution of a lithium or ammonium salt. Especially mentioned as solvents are ethylene carbonate, propylene carbonate, butylene carbonate, dimethyl carbonate, γ-butyrolactone, acetonitrile and 1,2-dimethoxyethane and especially mentioned as salts are the lithium salts $LiAsF_6$, $LiBF_4$, $LiPF_6$ and $LiClO_4$, or ammonium salts.

The document Chemical Abstract, Vol. 106, No. 10 describes an electrolyte based on propylene carbonate and on a tetrafluoroborate enclosed in a crown ether, probably in order to improve the solubility of the tetrafluoroborate.

Patent Abstracts of Japan, Vol. 017, No. 249 describes an electrolyte formed from a quaternary ammonium salt of tetrafluoroboric acid in solution in θ-butyrolactone, optionally as a mixture with acetonitrile or nitromethane.

Patent Abstracts of Japan, Vol. 014, No. 573 describes an electrolyte formed from phosphonium and ammonium salts in solution in propylene carbonate.

Many other supercapacitors have been described which make use of other organic solutions, for example potassium-based organic solutions, such as document WO-A-94/28563.

Nevertheless, there is a need to provide improved electrolytic systems which give optimum capacitance in order to produce high-power supercapacitors while still allowing low-cost mass production.

Surprisingly, the inventors have found that it is possible to use, advantageously, an electrolyte consisting of an organic solution of a salt whose cation is the sodium or potassium cation, or the cation of an alkaline-earth metal chosen from magnesium or calcium, in a solvent comprising one or more amides.

The invention therefore relates to an ideally polarizable supercapacitor consisting of a positive electrode and its current collector, a negative electrode and its current collector, said electrodes comprising a carbon material having a high specific surface area, of a separator and of a nonaqueous liquid electrolyte impregnating said separator and said electrodes, characterized in that the nonaqueous liquid electrolyte is an organic solution of a sodium or potassium salt or an alkaline-earth metal salt, said salts being present by themselves or as a mixture in a solvent comprising one or more amides.

The required properties for a carbon material that can be used as electrodes are a high specific surface area per unit weight, a low electrical resistance and good electrochemical stability.

The carbon materials may be in the form of powders or fibers and are obtained, for example, from petroleum pitch, phenolic resin, coconut shells and other equivalent products. Such carbon materials are, for example, described in documents U.S. Pat. No. 4,562,511 or U.S. Pat. No. 5,450,279.

The electrode is based on a carbon material, for example an active carbon having a specific surface area of between 300 and 3000 $m^2/g$, preferably greater than 1000 $m^2/g$.

According to an advantageous variant, each electrode is formed from a porous composite film of a polymeric material having a high specific surface area, especially greater than 10 $m^2/g$, filled with a carbon material, especially active carbon, and preferably greater than 20 $m^2/g$.

The polymeric material is formed from thermoplastic elastomers or polymers which are insoluble in the aqueous and/or organic solvents and which ensure cohesion of the product (structural polymers or elastomers) and from thermoplastic polymers or elastomers having polar groups which remain in the film after the manufacturing process that results in said porous film has been carried out.

Among insoluble elastomers or polymers, mention may especially be made of polyolefins such as polypropylenes, polyethylenes and ethylene-propylene copolymers. These polyolefins are such that they can be produced in the form of film and are well known especially as packaging films. They may include, for example, be low-density or high-density polyethylene optionally comprising as copolymer a greater or lesser amount of an alpha-olefin.

They may also include polyamides, such as polyether-block-polyamides, polyimides, vinyl copolymers carrying a high ethylene monomer content, such as polyethylene vinyl acetate having a high ethylene monomer content, acrylic polymers, aromatic polymers like the polystyrenes, such as polystyrene-butadiene copolymer, fluorinated polymers such as polyvinylidene fluoride, copolymers formed from the monomers belonging to one of the abovementioned families, for example vinylidene fluoride-hexafluoropropylene copolymers and vinylidene fluoride-trifluoroethylene copolymers.

Preferably, the thermoplastic elastomers or polymers insoluble in the solvents are chosen from the polyolefin group.

Among the soluble polymers, mention may be especially made of polymers which are soluble in the following solvents: water, alcohols, dimethylformamide, dimethylsulfoxide, tetrahydrofuran and acetone.

As long as, of course, the degree of polymerization is appropriate to solvent removal, the soluble polymers are especially chosen from polyethers, such as polyoxyethylene and polyoxypropylene, and polyalcohols, such as polyvinyl alcohol and ethylenevinyl alcohol copolymers.

Polymers that can be calcined using the standard methods may also be mentioned.

The calcinable polymers correspond to polymers that are soluble in the abovementioned solvents and may again be chosen from polymers whose decomposition temperature is less than that of the structural polymer or elastomer, for example cellulose.

The choice of these polymers may be made in a known manner by simple tests within the competence of those skilled in the art.

Preferably, the composite film comprises at least 30% by weight of fillers, advantageously between 40 and 90% and preferably between 50 and 85%.

Another characteristic of the porous composite film according to the invention resides in the fact that it is in a homogeneous and regular form, that is to say the fillers are intimately mixed with the polymeric material, unlike, for example, the sheets obtained by coating a mixture of carbon fillers with a small proportion of binder material of the polytetrafluoroethylene type.

The porous composite films have the advantage of being able to be processed according to the coiling technology.

These films are self-supporting, that is to say they avoid the use of a support.

A process for preparing a porous composite film as described above consists in that:

a) a compound comprising one or more insoluble polymers, or one or more soluble or calcinable polymers, and one or more fillers having a high specific surface area are formed;

b) said compound is extruded so as to form an extruded precursor film;

c) the soluble or calcinable polymer(s) is (are) removed from the extruded precursor film;

d) the porous composite film is recovered.

The said process is therefore an extrusion-removal process allowing a composite film having a high specific surface area to be obtained.

The word "removed" could be understood to mean that a substantial part of the soluble or calcinable polymers is removed in order to form pores, it being understood that complete removal of these polymers is very improbable, in particular because of their affinity for the active carbon.

Phase a) of the process comprises mixing, in a homogeneous manner, whether in solution or in suspension, all the constituents, namely one or more polymers that are solvent-insoluble and correspond to the polymeric material forming the structure of the composite film, another polymer or other polymers that are solvent-soluble or calcinable and one or more fillers having a high specific surface area, in the knowledge that the polymers providing the cohesion of the composite film (insoluble polymers) and the fillers having a high specific surface area are not removed during step c). The mixing may also be carried out by means of the extruder allowing step b) to be implemented.

Among the soluble polymers which will be removed during step c), any soluble polymer that can be mixed according to step a) may be chosen, and polymers that may be especially mentioned are those soluble in water for example, dimethylformamide, dimethylsulfoxide, tetrahydrofuran or acetone.

Provided that, of course, the degree of polymerization is appropriate to solvent removal, the soluble polymers are especially chosen from polyethers, such as polyoxyethylene and polyoxypropylene, and polyalcohols, such as polyvinyl alcohol and ethylenevinyl alcohol copolymers.

As polymers that can be removed in order to form pores, polymers that can be calcined using standard methods may also be mentioned.

The calcinable polymers may be chosen from polymers whose decomposition temperature is less than that of the structural polymer or elastomer, for example cellulose.

The choice of these polymers may be made in a known manner by simple tests within the competence of those skilled in the art.

The mixing of the various constituents of the product is carried out at an appropriate temperature, especially by means of an extruder. In this case, steps a) and b) are carried out simultaneously in order to give an intermediate precursor product having a very low specific surface area (less than approximately 1 $m^2/g$)

The precursor product may be extruded again, in the form of a film, especially a thin film whose thickness is less than approximately 300 $\mu$m.

According to an advantageous variant, step b) is therefore carried out in two steps:

a first extrusion step (i) consisting in forming granules;

a second extrusion step (ii) consisting in forming a film.

The first step is advantageously carried out in a co-rotating twin-screw extruder, with a rod die for example, while the second step is advantageously carried out in a single-screw extruder with a sheet die.

The extruded precursor product, either in granular form or in film form, is then subjected to the removal step c), allowing the soluble polymer to be removed.

This removal step may be carried out especially by dissolving the soluble polymer by bringing it into contact with a suitable solvent.

A calcining operation may also be carried out using a known process, which consists in slowly increasing the temperature up to the degradation temperature of the polymer to be removed.

The films are then recovered and have a "BET" specific surface area of greater than approximately 10 $m^2/g$, preferably greater than approximately 20 $m^2/g$.

The electrodes may also be formed from an activated carbon cloth having a specific surface area of greater than 1000 m²/g.

Other carbon electrodes may be produced from a metal foil, for example aluminum foil, acting as collector, on which foil a paste containing an activated carbon powder as main component and a binder based on a fluororesin or equivalent resin, for example, is deposited.

It is also possible to deposit a layer of aluminum, by plasma sputtering, on an activated-carbon fiber cloth.

Of course, the invention is not limited to these embodiments of electrodes and other constructions may also be envisioned without departing from the scope of the invention.

The electrolyte solution is based on an aprotic polar solvent comprising one or more amides. Among these solvents, those which have a high dielectric constant ($\epsilon$), and a low viscosity and which maintain their liquid state over a wide temperature range are chosen.

The amides satisfy the formula:

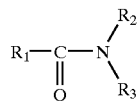

in which:

$R_1$ is a hydrogen atom or a $C^1$ to $C^3$ alkyl radical, especially a methyl, ethyl or n-propyl radical; $R_2$, $R_3$, which are identical or different, are the hydrogen atom or a methyl, ethyl or propyl radical, preferably the hydrogen atom or the methyl radical.

Among the amides, mention may be especially made of dimethylformamide, formamide, N-methyl-formamide, N-methylpropionamide and N,N-dimethyl-acetamide, by themselves or as a mixture.

The polar solvent may also comprise, as a minor compound, esters, nitriles, or carbonates. The term "minor" means that said compound does not appreciably affect the properties of the solvent (preferably <20% by weight).

Among esters, mention may especially be made of cyclic esters such as γ-butyrolactone.

Among carbonates, mention may especially be made of cyclic carbonates such as propylene carbonate.

Among nitriles, mention may especially be made of acetonitrile.

These solvents may be used by themselves or as a mixture.

Preferably, in order to reduce the viscosity of the solution, the solvent is combined with a cosolvent capable of lowering the viscosity of the solution.

It will be recalled in fact that, for optimum operation of the electrolyte, it is desirable for the viscosity not to be too high and in general to be between 0.0002 and 0.003 Pa.s (0.2 and 3 cps) at 25° C.

The cosolvent is chosen from methyl formate, ethyl formate, dimethyl carbonate, diethyl carbonate, methyl acetate, ethyl acetate, dimethoxymethane, dimethoxyethane, diethoxymethane, diethoxyethane, dioxolane, tetrahydrofuran and acetonitrile.

Preferably, the salt is present in the solution at a concentration of 0.3 to 3 mol per liter.

The high mobility of the sodium, potassium, manganese and calcium cations, compared with the lithium cations, makes it possible to obtain higher powers, or in other words minimizes the resistive terms.

The sodium or potassium salts are preferably chosen from the group consisting of NaCl, NaBr, NaBF$_4$, NaPF$_6$, NaClO$_4$ and NaRSO$_3$, R being a lower perfluoroalkyl radical (having from 1 to 6 carbon atoms, especially CF$_3$), NaAsF$_6$, NaSCN, KF, KCl, KBr, KBF$_4$, KPF$_6$, KNO$_3$, KClO$_4$, KRSO$_3$, R being a lower perfluoroalkyl radical (having 1 to 6 carbon atoms, especially CF$_3$), KAsF$_6$ or KSCN.

The magnesium or calcium salts are preferably chosen from the group consisting of MgCl$_2$, MgSO$_4$, Mg(ClO$_4$)$_2$, CaCl$_2$, Ca(NO$_3$)$_2$, CaSO$_4$ or Ca(ClO$_4$)$_2$.

The separator present between two electrodes is an ionically conductive porous separator. The separator consists, for example, of a microporous polyethylene film.

The invention will now be described with the aid of several particular examples, given in a nonlimiting manner, and of the appended drawing which shows a diagrammatic cross section of a supercapacitor according to the invention.

According to the appended drawing, the supercapacitor 1 is formed from two carbon composite electrodes 2, 3 and a polymer film, made of polypropylene filled with active carbon. The two electrodes are covered with a current collector 4, 5 and separated by a separator 6.

A liquid electrolyte of an organic solution according to the invention impregnates the two electrodes.

EXAMPLE 1

The electrolyte consists of dimethylformamide and sodium tetrafluoroborate. The salt concentration is 1.3 mol per liter. The conductivity of the electrolyte at 25° C. is 22 mS/cm.

EXAMPLE 2

The electrolyte if formed from a solution of potassium thiocyanate in formamide. The salt concentration is 2.8 mol per liter and the conductivity of the electrolyte at 25° C. is 22 mS/cm.

Example 2 is reproduced with other solvents and other sodium and potassium salts (Examples 3, 4 and 5).

Moreover, comparative tests were carried out with lithium hexafluorophosphate and lithium tetrafluoroborate (Examples 6 and 7).

The results are given in the table below. These tests show the advantages provided by the electrolytes according to the invention. The abbreviations used are well known and have the following meanings:

$\kappa_{max}$ is indicated in millisiemens/cm (mS/cm);
FA is formamide;
NMF is methylformamide;
DMF is dimethylformamide;
NMP is methylpropionamide;
DMA is dimethylacetamide.

| Ex. | Salts | FA | NMF | DMF | NMP | DMA |
|---|---|---|---|---|---|---|
| 3 | NaPF$_6$ | $K_{max}$ = 12.71 at 1.76 M | $K_{max}$ = 16.10 at 1.30 M | $K_{max}$ = 22.43 at 1.16 M | $K_{max}$ = 8.51 at 0.92 M | $K_{max}$ = 13.90 at 1.10 M |
| 4 | KPF$_6$ | $K_{max}$ = 10.39 at 0.88 M | $K_{max}$ = 15.35 at 1.60 M | $K_{max}$ = 25.20 at 1.22 M | $K_{max}$ = 7.81 at 0.83 M | $K_{max}$ = 11.86 at 0.80 M |
| 5 | NaBF$_4$ | $K_{max}$ = 14.28 at 1.78 M | $K_{max}$ = 17.00 at 1.42 M | $K_{max}$ = 21.81 at 1.28 M | $K_{max}$ = 8.07 at 1.00 M | $K_{max}$ = 13.25 at 0.98 M |
| 6 | LiPF$_6$ | $K_{max}$ = 13.54 at 1.88 M | $K_{max}$ = 15.36 at 1.34 M | $K_{max}$ = 19.35 at 1.11 M | $K_{max}$ = 7.27 at 0.90 M | $K_{max}$ = 12.27 at 0.91 M |

-continued

| Ex. | Salts | FA | NMF | DMF | NMP | DMA |
|---|---|---|---|---|---|---|
| 7 | LiBF$_4$ | $K_{max}$ = 17.36 at 2.42 M | $K_{max}$ = 17.47 at 1.40 M | $K_{max}$ = 20.61 at 1.09 M | $K_{max}$ = 8.30 at 0.89 M | $K_{max}$ = 13.50 at 0.90 M |

The electrodes may also be in the form of a film obtained according to the following process.

The proportions by mass of the starting compounds (powders) are as follows:

40% active carbon (having a specific surface area of 1250 m$^2$/g)

10% ethylene-propylene copolymer

50% polyoxyethylene (POE 300 000).

All the powder constituents are mixed as homogeneously as possible by mixing them by means of a co-rotating twin-screw extruder 25 D in length, with two mixing zones and three transport zones. The machine used is a twin-screw machine 19 mm in diameter and the temperature profile used is as follows: 160/170/180/190/200° C.

Die pressure: 10.5 MPa

Number of revolutions per minute: 400

Output: 1.8 kg/h.

The granules obtained are introduced into a single-screw machine 30 D in length (D=diameter) for extrusion of a primer. The machine used is a twin-screw machine 30 mm in diameter and the temperature profile used is as follows: 160/170/180/190/220° C.

Die pressure: 17.5 MPa

Number of revolutions per minute: 15

Output: 2.5 gk/h.

The film obtained has a thickness of 180 μm.

The next step consists in immersing the film obtained in water at room temperature for a residence time of 5 minutes. The film is then dried at 40° C. for one hour.

The average proportions by mass of the compounds after treatment are as follows:

60% active carbon

15% ethylene-propylene copolymer

25% polyoxyethylene.

It is then possible to metalize, using aluminum (for example: 0.5 □/Ω), the films obtained in a metalizing machine at a pressure of the order of 0.01 Pa (10$^{-4}$ mbar).

The physical characterization of the films obtained, whether metalized or not, gives the following data:

elongation at break in %: 0.89 at 20° C.; 1.2 at 40° C.; 1.68 at 60° C.;

coiling tension (6 mm diameter core): 0.05 g/μm/mm;

electrochemical capacitance of 26 F/g of electrode according to the method described in Example 1;

"BET" specific surface area of less than 1 m$^2$/g of film after extrusion and "BET" specific surface area of 60 m$^2$/g of film after passing into water, by immersion for approximately five minutes.

The supercapacitors according to the invention have several advantages, namely:

markedly lower cost of the salts, compared with their lithium or quaternary ammonium salt homologues;

high conductivity of the electrolytes, often greater than their lithium salt homologues (greater than 20 mS/cm);

electroactivity range allowing cycling of the element under a potential difference of greater than or equal to 2.5 V;

good electrochemical stability;

good temperature withstand (approximately −25 to +85° C.).

These electrolytes are more particularly intended to be used as ionic conductors in the production of supercapacitor-type systems for electrochemical energy storage.

These systems make it possible to meet power demands lasting between a few hundreds of milliseconds and a few tens of minutes. The applications cover the entire range with regard to electrochemical energy storage. Preferably, these are the applications in the portable, stationary and on-bord fields and, in general, the applications in the electronics, electronic engineering and electrical engineering fields

What is claimed is:

1. Ideally polarizable supercapacitor consisting of a positive electrode and its current collector, of a negative electrode and its current collector, said electrodes comprising a carbon material, of a separator and of a nonaqueous liquid electrolyte impregnating said separator and said electrodes, characterized in that the nonaqueous liquid electrolyte is an organic solution of a sodium or potassium salt or an alkaline-earth metal salt, by itself or as a mixture in a solvent comprising one or more amides; and the solution is based on an aprotic polar solvent comprising an amide of formula:

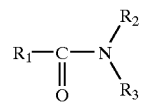

in which:

$R_1$ is a hydrogen atom or a $C_1$ to $C_3$ alkyl radical, $R_2$, $R_3$, which are identical or different, are the hydrogen atom or a methyl, ethyl or propyl radical.

2. Supercapacitor according to claim 1, characterized in that the carbon material has a specific surface area of between 300 and 3000 m$^2$/g.

3. Supercapacitor according to claim 2, characterized in that the carbon material has a specific surface area greater than 1000 m$^2$/g.

4. Supercapacitor according to claim 1, characterized in that each electrode is formed from a film of polymeric material, having a specific surface area greater than 10 m$^2$/g, filled with a carbon material.

5. Supercapacitor according to claim 4, characterized in that the polymeric material comprises polymers chosen from the group consisting of polyolefins.

6. Supercapacitor according to claim 1, characterized in that each electrode is formed from an active carbon cloth having a specific surface area greater than 1000 m$^2$/g.

7. Supercapacitor according to claim 1, characterized in that the organic solution comprises, in a minor amount, one or more solvents chosen from the group consisting of esters, nitrites and carbonates.

8. Supercapacitor according to claim 7, characterized in that the minor solvents are chosen from the group consisting of propylene carbonate, γ-butyrolactone and acetonitrile, by themselves or as a mixture.

9. Supercapacitor according to claim 1, characterized in that the solvent is in the form of a mixture with a cosolvent capable of lowering the viscosity of the solution.

10. Supercapacitor according to claim 9, characterized in that the cosolvent is chosen from, methyl formate, ethyl formate, dimethyl carbonate, diethyl carbonate, methyl acetate, ethyl acetate, dimethoxymethane, dimethoxyethane, diethoxymethane, diethoxyethane, dioxolane, tetrahydrofuran and acetonitrile.

11. Supercapacitor according to claim 1, characterized in that the salt is present in a concentration of 0.3 to 3 mol per liter.

12. Supercapacitor according to claim 1 or 11, characterized in that the salt is chosen from the group consisting of NaCl, NaBr, NaBF$_4$, NaPF$_6$, NaClO$_4$, and NaRSO$_3$, R being a lower perfluoroalkyl radical (having from 1 to 6 carbon atoms, especially CF$_3$), NaAsF$_6$, NaSCN, KF, KCl, KBr, KBF$_4$, KPF$_6$, KNO$_3$, KClO$_4$, KRSO$_3$, R being a lower perfluoroalkyl radical (having 1 to 6 carbon atoms, especially CF$_3$), KAsF$_6$ or KSCN.

13. Supercapacitor according to claim 1 or 11, characterized in that the salt is chosen from the group consisting of MgCl$_2$, MgSO$_4$ Mg (ClO$_4$)$_2$, CaCl$_2$, Ca (NO$_3$)$_2$, CaSO$_4$ or Ca (ClO$_4$)$_2$.

14. Supercapacitor according to claim 1, characterized in that each electrode is formed from a film of polymeric material, having a specific surface area greater than 20 m$^2$/g, filled with a carbon material.

15. Supercapacitor according to claim 1, characterized in that the amide is chosen from the group consisting of dimethylformamide, formamide, N-methylformamide, N-methylpropionamide and N,N-dimethylacetamide, by themselves or as a mixture.

16. Ideally polarizable supercapacitor consisting of a positive electrode and its current collector, of a negative electrode and its current collector, said electrodes comprising a carbon material, of a separator and of a nonaqueous liquid electrolyte impregnating said separator and said electrodes, characterized in that the nonaqueous liquid electrolyte is an organic solution of a sodium or potassium or magnesium or calcium salt, by itself or as a mixture in a solvent comprising one or more amides; and the solution is based on an aprotic polar solvent comprising an amide of formula:

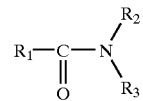

in which:

R$_1$ is a hydrogen atom or a C$_1$ to C$_3$ alkyl radical,

R$_2$, R$_3$, which are identical or different, are the hydrogen atom or a methyl, ethyl or propyl radical.

* * * * *

UNITED STATES PATENT AND TRADEMARK OFFICE
CERTIFICATE OF CORRECTION

PATENT NO.    : 6,671,166 B1
DATED         : December 30, 2003
INVENTOR(S)   : Penneau et al.

It is certified that error appears in the above-identified patent and that said Letters Patent is hereby corrected as shown below:

Title page,
Item [75], Inventors, please delete "Avon" and insert -- Samoreau --; please delete "Pleuven" and insert -- Anglet --.

Column 8,
Line 51, please delete "nitrites" and insert -- nitriles --.

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,671,166 B1
DATED         : December 30, 2003
INVENTOR(S)   : Penneau et al.

It is certified that error appears in the above-identified patent and that said Letters Patent is hereby corrected as shown below:

Title page,
Item [75], Inventors, please delete "Avon" and insert -- Samoreau --; and please delete "Pleuven" and insert -- Anglet --.
Item [56], References Cited, FOREIGN PATENT DOCUMENTS, please insert
-- AM   JP61204935    Japan --
OTHER PUBLICATIONS, insert
-- Patent Abstracts of Japan, vol. 96, no. 009 9/30/96 --
Item [57], ABSTRACT,
Please delete "The invention concerns a high...solvent containing an acid." and insert -- An ideally polarizable supercapacitor comprising a positive electrode, its current collector, negative electrode and the negative electrode's current collector, the electrodes made of a carbon material and a nonaqueous liquid electrolyte is disclosed. Separator and electrodes are impregnated with a nonaqueous liquid electrolyte. The nonaqueous liquid electrolyte is an organic solution of a sodium or potassium salt or an alkaline earth metal in a solvent comprising one or more amides. --

Column 8,
Line 51, please delete "nitrites" and insert -- nitriles --.

Signed and Sealed this

Twenty-third Day of November, 2004

JON W. DUDAS
*Director of the United States Patent and Trademark Office*